United States Patent [19]
Honda

[11] Patent Number: 5,596,497
[45] Date of Patent: Jan. 21, 1997

[54] CONTROL CIRCUIT FOR VEHICLE SAFETY DEVICE

[75] Inventor: Ziro Honda, Itami, Japan

[73] Assignee: Mitsubishi Denki Kabushiki Kaisha, Tokyo, Japan

[21] Appl. No.: 389,788

[22] Filed: Feb. 16, 1995

[30] Foreign Application Priority Data

Feb. 17, 1994 [JP] Japan ................................. 6-020229

[51] Int. Cl.$^6$ ............................................. B60R 21/32
[52] U.S. Cl. .................... 364/424.055; 280/735; 307/10.1
[58] Field of Search .................... 364/424.01, 424.05; 307/9.1, 10.1; 280/728.1, 734, 735

[56] References Cited

U.S. PATENT DOCUMENTS

| | | | |
|---|---|---|---|
| 5,135,254 | 8/1992 | Masegi et al. | 280/735 |
| 5,204,547 | 4/1993 | Schumacher et al. | 307/10 |
| 5,409,258 | 4/1995 | Kawabata | 280/735 |
| 5,501,486 | 3/1996 | Fujita et al. | 280/735 |

FOREIGN PATENT DOCUMENTS 357748  3/1991  Japan.

*Primary Examiner*—Michael Zanelli
*Attorney, Agent, or Firm*—Leydig, Voit & Mayer

[57] ABSTRACT

A control circuit for a vehicle safety device of the invention includes a starting circuit for starting the vehicle safety device by electrical energy supplied from a power supply section. A starting signal generating circuit detects vehicle collision and generates a starting signal based upon the results of the detection. A starting control circuit is provided to detect a vehicle collision and generate a starting signal. A starting control circuit is connected between a power supply section and the starting circuit. The starting control circuit supplies current from the power supply section to the starting circuit when the starting signal has been generated by the starting signal generating circuit, and blocks supply of current from the power supply section to the starting circuit when the current value has exceeded a predetermined value.

4 Claims, 5 Drawing Sheets

CONTROL CIRCUIT FOR VEHICLE SAFETY DEVICE

BACKGROUND OF THE INVENTION

1. Field of the Invention

The present invention relates to a control circuit for a vehicle safety device which starts the vehicle safety device.

2. Description of the Related Art

FIG. 4 illustrates a conventional control circuit for vehicle safety device such as that disclosed, for example, in Japanese Patent Laid-Open No. 3-57748. Through a well-known safety switch 7, ignition squibs 5 and 6, field-effect transistors 11 and 21, and current-limiting circuits 15 and 25 are connected in series with power supply section 4. Ignition squibs 5 and 6 function respectively as starting means for a driver's seat air bag A and starting means for air bag B disposed near the passenger seat next to the driver. A current-flow controlling section 3 is connected to a sensor 2 which detects acceleration of the vehicle (not illustrated) and outputs an acceleration signal KS. The current-flow controlling section 3 performs predetermined processings on acceleration signal KS, judges whether or not the vehicle has collided, and, when it has judged that a vehicle collision occurred, outputs starting signals T1 and T2 respectively to the gates of transistors 11 and 21 respectively through resistances 14 and 24.

Current-limiting circuits 15 and 25 are composed of, respectively, current detecting resistance 12 and transistor 13, and current detecting resistance 22 and transistor 23. Detection voltages Va and Vb, developed respectively across current detecting resistances 12 and 22, are applied, respectively, between the bases and emitters of transistors 13 and 23, with the collectors of transistors 13 and 23 connected respectively to the gates of transistors 11 and 21.

When the speed of a vehicle exceeds a predetermined value, the safety switch 7 is closed. With the switch in a closed state, starting signals T1 and T2, output from the current-controlling section 3, turns on, respectively, field-effect transistors 11 and 21. This causes current to flow from the power supply section 4 to ignition squibs 5 and 6. Here, the currents which flow from the power supply section 4 into the ignition squibs 5 and 6, are maintained at predetermined values, respectively, by the action of current-controlling circuits 15 and 25. The circuit constants of current-controlling circuits 15 and 25 are preset so that sufficient current flows through ignition squibs 5 and 6 which allows inflation of air bags A and B when transistors 11 and 21 are on. This prevents an excess of ignition current flow.

The power supply section 4 contains a battery 41, connected to safety switch 7 through a diode 46, and a high-capacity capacitor 44 connected directly to safety switch 7. A booster circuit 42 for supplying charging voltage is connected to the capacitor 44 through a diode 43. Upon vehicle collision, ignition current is supplied from battery 41 and capacitor 44 to ignition squibs 5 and 6. It is to be noted that even when disconnection at the terminals of battery 41 or the like occurs upon collision, electrical energy accumulated on the plates of the capacitor allows ignition current to be supplied to ignition squibs 5 and 6, In such a control circuit for a vehicle safety device, as shown in FIG. 5, while ignition squibs 5 and 6 are placed respectively near the driver's seat air bag and the air bag for the passenger's seat next to the driver, the typical battery 41 and sensor 2 and control unit 1 which accommodate other component parts are placed in the engine room of the vehicle. This means that the control unit 1 and the ignition squibs 5 and 6 are connected through long wiring lines L, called a harness. Consequently, when the wiring lines L are short-circuited with the vehicle body due to vehicle collision, deterioration of the line L, or the like, the line L may be electrically grounded. For example, when the point adjacent to the ignition squib with a high potential, point 1 (P1), in FIG. 4 is short-circuited with the vehicle body, the vehicle speed increases beyond a predetermined value, which closes the safety switch 7. When this happens, the positive terminal of battery 41 is in the same condition as when it is short-circuited with ground, so that an excessive current flows from battery 41 to safety switch 7 through wiring lines L. This may result in such hazards as fire. On the other hand, when the point adjacent to ignition squib 6 with a low potential, point 2 (P2), is short-circuited, even though there is no starting signal T1 output from current-flow controlling section 3, current flows through ignition squib 6, which accidently explodes air bag A.

SUMMARY OF THE INVENTION

In view of the above-described problems, the invention aims at providing a control circuit for a vehicle safety device which is capable of preventing fire and malfunctioning of the safety device caused by excess current, even when wiring lines, connected to ignition squibs, have been accidentally grounded.

To these ends, the invention provides a control circuit for a vehicle safety device comprising a starting means for starting the vehicle safety device by electrical energy supplied from a power supply means; starting signal generating means which detects a vehicle collision and generates a starting signal; and starting control means, connected between power supply means and starting means, which supplies current from the power supply means to the starting means when starting signal has been generated by the starting signal generating means, and which blocks supply of current from the power supply means to the starting means when the current value has exceeded a predetermined value.

DESCRIPTION OF THE PREFERRED EMBODIMENTS

A description will be made below of the embodiments of the invention with reference to the drawings.

Figure 1:
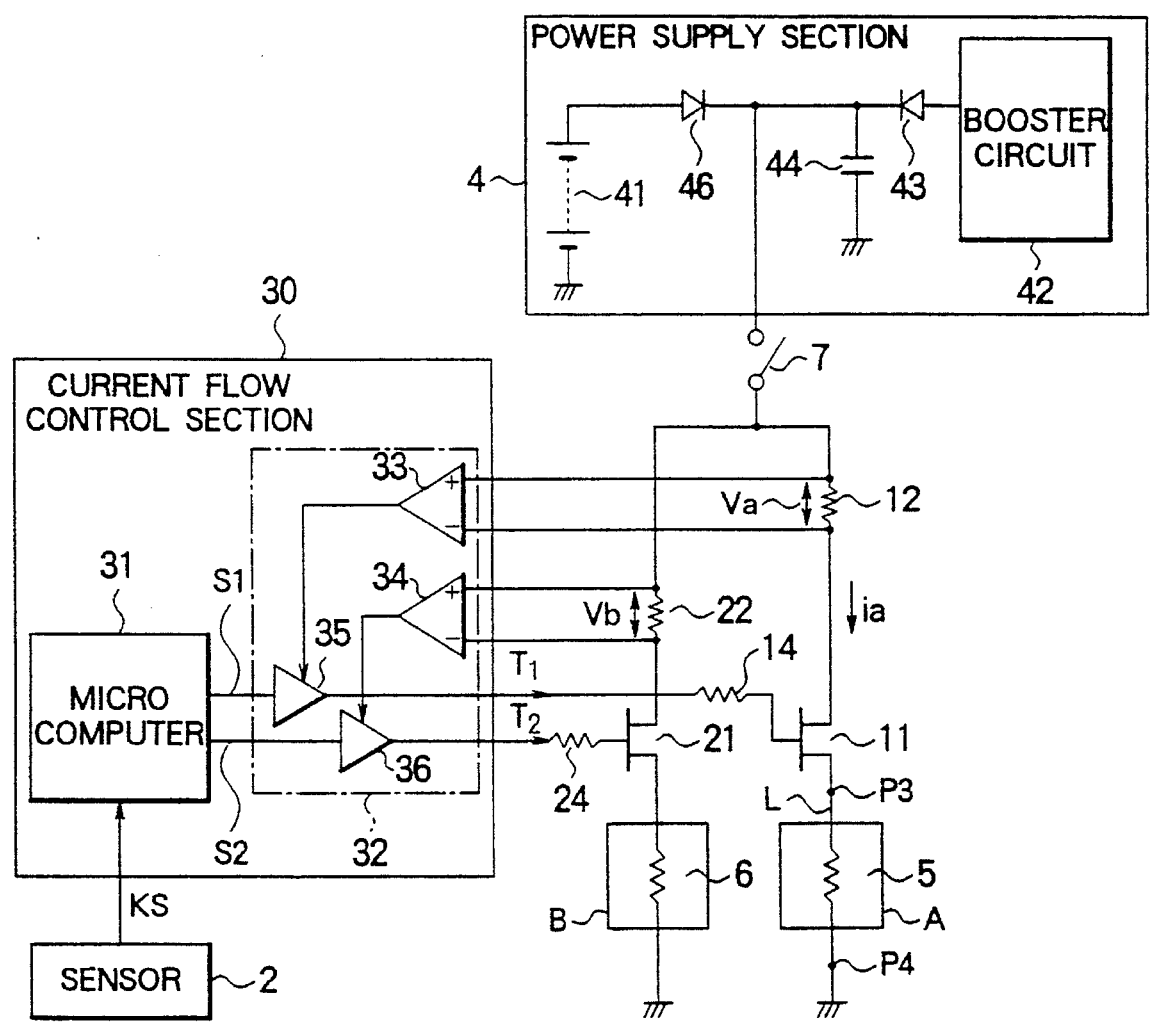
Fig.1 illustrates a control circuit for a vehicle safety device as a first embodiment of the invention.

FIG. 1 illustrates a control circuit for a vehicle safety device as a first embodiment of the invention. Referring to the figure, a safety switch 7 is connected to a power supply section 4, with a current-detecting resistance 12, field-effect transistor 11, and ignition squib 5 connected in series between this safety switch 7 and ground. Likewise, a current-detecting resistance 22, a field-effect transistor 21, and ignition squib 6 are connected in series between the safety switch 7 and ground. Ignition squibs 5 and 6 function respectively as starting means for driver's seat air bag A and starting means for air bag B disposed near the passenger seat next to the driver.

A sensor (2) detects acceleration of a vehicle (not illustrated) and outputs an acceleration signal KS. Connected to the sensor 2 is a current-flow controlling section 30. The current-flow controlling section 30 includes a microcomputer 31 and a current controlling section 32. The microcomputer 31 performs predetermined processings on acceleration signal KS generated from sensor 2, judges whether or not a vehicle collision has occurred, and, when it judges that a vehicle collision has occurred, generates starting signals S1 and S2. The current controlling section 32 includes comparators 33 and 34 which compare, respectively, detection voltages Va to a predetermined voltage value $Va_{TH}$, and Vb to a predetermined voltage value $Vb_{TH}$, with the detection voltages Va and Vb developed respectively across current detecting resistances 12 and 22; and control circuits 35 and 36 which, in accordance with the output from comparators 33 and 34, control the input of starting signals S1 and S2, generated from the microcomputer 31, respectively, to the gates of field-effect transistors 11 and 21. Examples of control circuits 35 and 36 which may be used include buffer circuits. Resistances 14 and 24 are connected, respectively, between the gate of field-effect transistor 11 and control circuit 35, and the gate of transistor 12 and control 36.

Power supply section 4 has battery 41 connected to safety switch 7 through diode 46; and large-capacity capacitor 44 connected directly with safety switch 7. A booster circuit 42 is connected to capacitor 44 through a diode 43 for supplying charging voltage.

The power supply section 4 is an exemplary power supply means. Ignition squibs 5 and 6 exemplary starting means. Sensor 2 and microcomputer 31 form staring signal generating means. Transistors 11 and 21 form an exemplary switching means. Resistances 12 and 22 form current detecting means. Current control section 32 forms exemplary current controlling means and control circuit 35 and 36 may form conduction controlling circuit. The switching means, current detecting means, and current controlling means form exemplary start-up control means.

A description will be made of the operation of the control circuit as the first embodiment. When the vehicle speed exceeds a predetermined value, the safety switch is closed. This connects the power supply section 4 with current detecting resistances 12 and 22. When no starting signal S1 is generated from microcomputer 31, the transistor 11 is in an off state, so that the voltage Va across current detecting resistance 12 is zero volts. Comparator 33 compares the detection voltage Va with a previously internally set predetermined voltage value $Va_{TH}$. However, here, since the detection voltage Va is smaller than a predetermined voltage value $Va_{TH}$, the comparator 33 generates a command signal to the control circuit 35 to cause it to be conductive. This causes the control circuit 35 to be connected with the microcomputer 31 and transistor 11, whereby the control circuit is in a conducting state. With the control circuit 35 in a conducting state, based on acceleration signal KS generated from sensor 2, microcomputer 31 judges that a vehicle collision occurred and, that as a result, starting signal S1 was generated. Since control circuit 35 is in a conducting state, starting signal S1 is input as starting signal T1 into the gate of transistor 11 through a resistor 14. This causes transistor 11 to be in an "on" state, so that ignition current $i_A$ flows through ignition squib 5 via current detecting resistor 12 and transistor 11, whereby inflation of air bag A is started.

At this time, ignition current $i_A$ is determined by the circuit constant of the circuit containing current detecting resistor 12, transistor 11, and ignition squib 5 connected in series, and the supply voltage of power supply section 4. This ignition current $i_A$ allows a predetermined voltage value $Va_{TH}$, which is slightly larger than voltage $V_A$ and developed across current detecting resistance 12, to be previously set at comparator 33. This maintains control circuit 35 in a conducting state.

When point 3 (P3) adjacent to transistor 11, connected to wiring lines L, which is connected to ignition squib 5, is accidently short-circuited with ground, the control circuit operates as follows. When starting signal S1 is not generated from microcomputer 31, the transistor 11 is in an off state, so that ignition current iA will not flow from power supply section 4 through current detecting resistance 12 and transistor 11.

Figure 2:
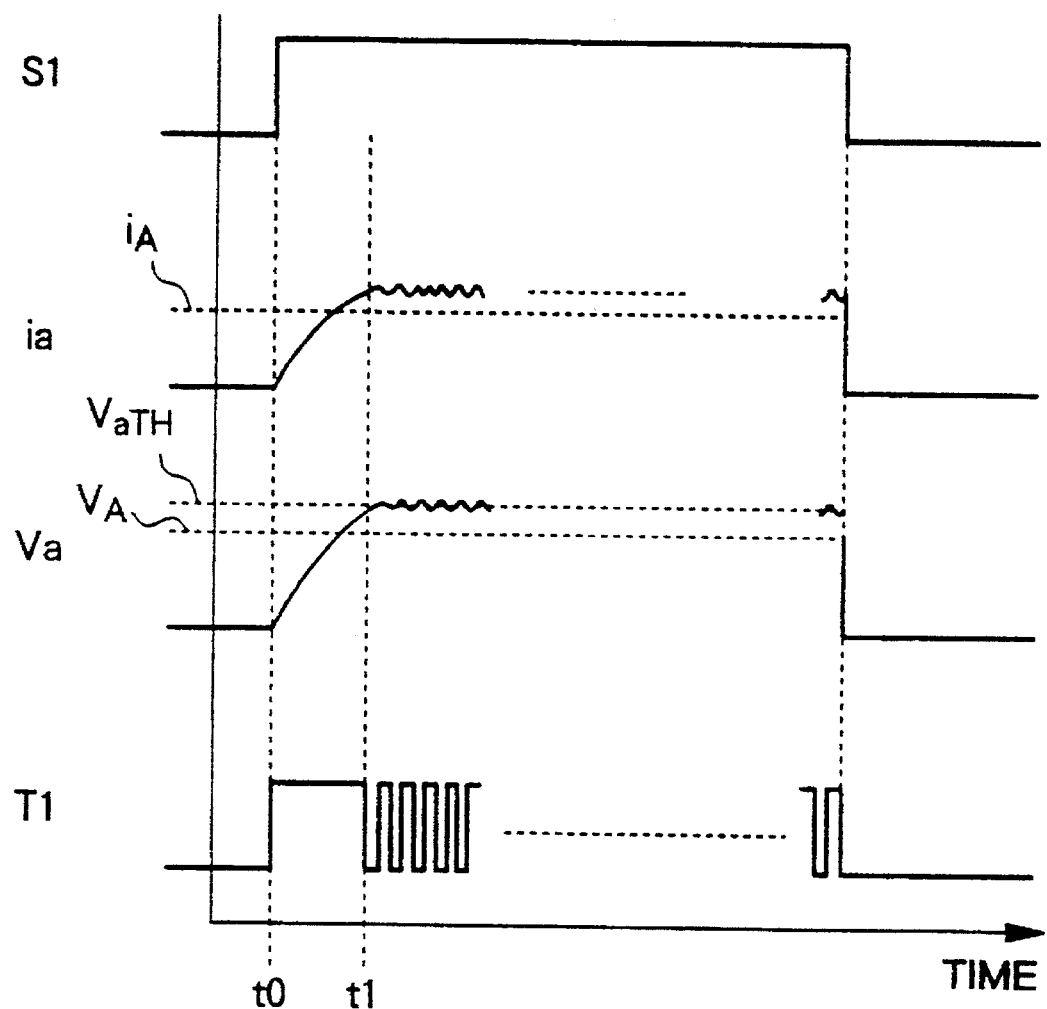
FIG.2 is a timing chart illustrating the operations of the control circuit as the first embodiment of the invention.

On the other hand, as shown in FIG. 2, a generation of starting signal S1 from microcomputer 31 at time t0, based on acceleration signal KS generated from sensor 2, causes starting signal T1 to be input into the gate of transistor 11 through control circuit 35. This causes transistor 11 to be in an on state, allowing current, ia, to flow from power supply section 4 through current detecting resistance 12 and transistor 11, and through P3 to ground. At this time, current ia flows directly from P3 to ground without passing through ignition squib 5, so that the resistance value of the circuit through which current, ia, passes is reduced by an amount equivalent to the resistance of ignition squib 5. For this reason, when normal inflation of air bag A is started, current ia is larger than ignition current $i_A$. Therefore, when voltage Va, developed across current detecting resistance 12 at time t1 exceeds the predetermined value $Va_{TH}$ set at comparator 33, control circuit 35 is blocked by the output from comparator 33, which prevents starting signal T1 from being input into the gate of transistor 11. This causes the transistor 11 to be in an off slate. As a result of this, current, ia, which flows through current detecting resistor 12, is decreased. As the current, ia, is decreased, the voltage Va across the resistor is also decreased, so that the output from comparator 33 causes control circuit 35 to be in a conducting state again. This causes transistor 11 to be in an "on" state. Accordingly, transistor 11 is in an "off" state and "on" state over and over again, whereby excess flow of current, ia, from power supply section 4 is prevented.

Even when point 4 (P4) adjacent to ground, connected to wiring lines L, which is connected to ignition squib 5 is accidentally grounded, no problems arise because this point is originally connected to ground.

Accordingly, even if wiring lines L are accidentally shorted with ground, fire and malfunctioning of air bag caused by excess current can be prevented from occurring. Although air bag A was taken as an example to describe the operation, air bag B may also be used to produce the same operations. In other words, even when wiring lines, connected to ignition squibs, are accidentally shorted with ground, fire and malfunctioning of air bag B can be prevented from occurring.

Second Embodiment

Figure 3:
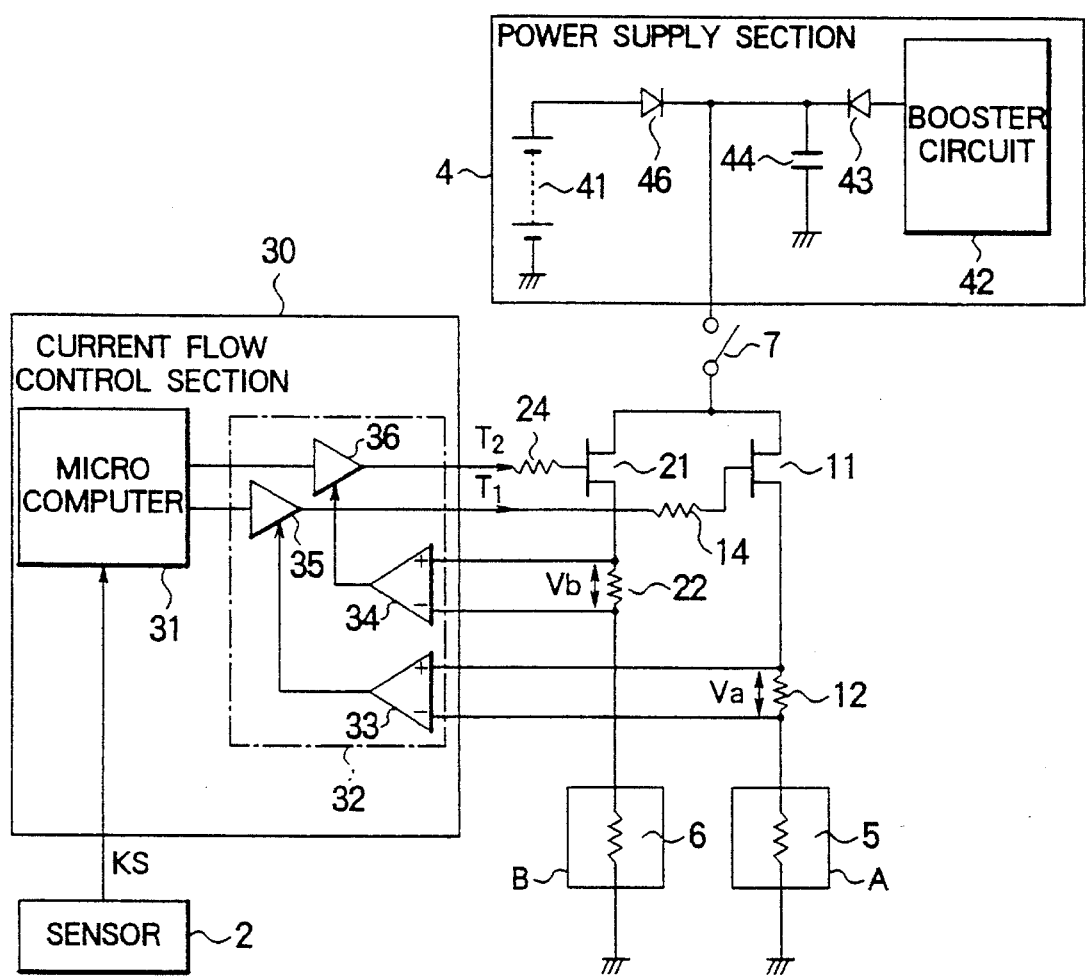
FIG.3 illustrates a control circuit for a vehicle safety device as a second embodiment of the invention.
Figure 4:
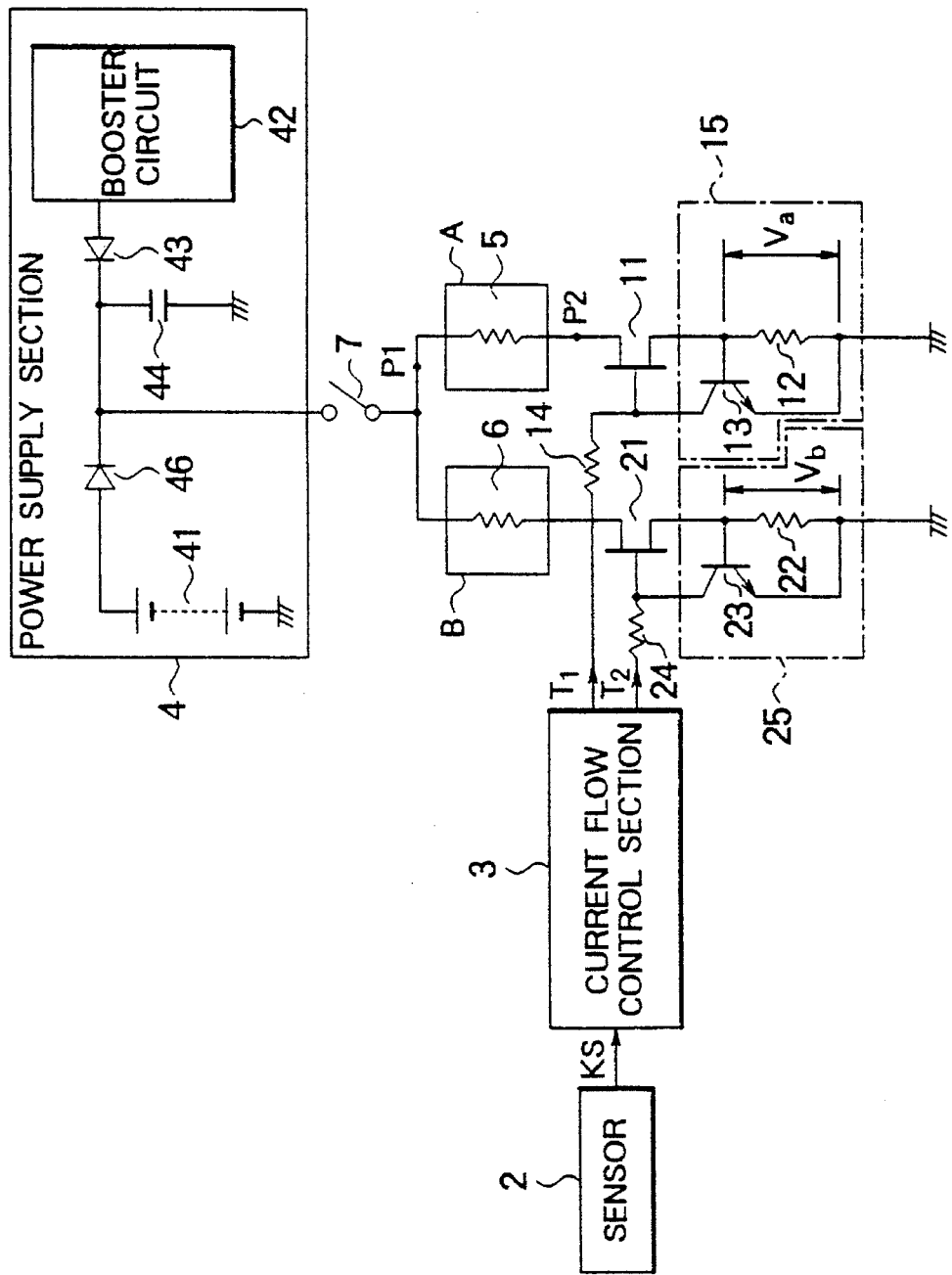
FIG.4 illustrates a conventional control circuit for a vehicle safety device.
Figure 5:
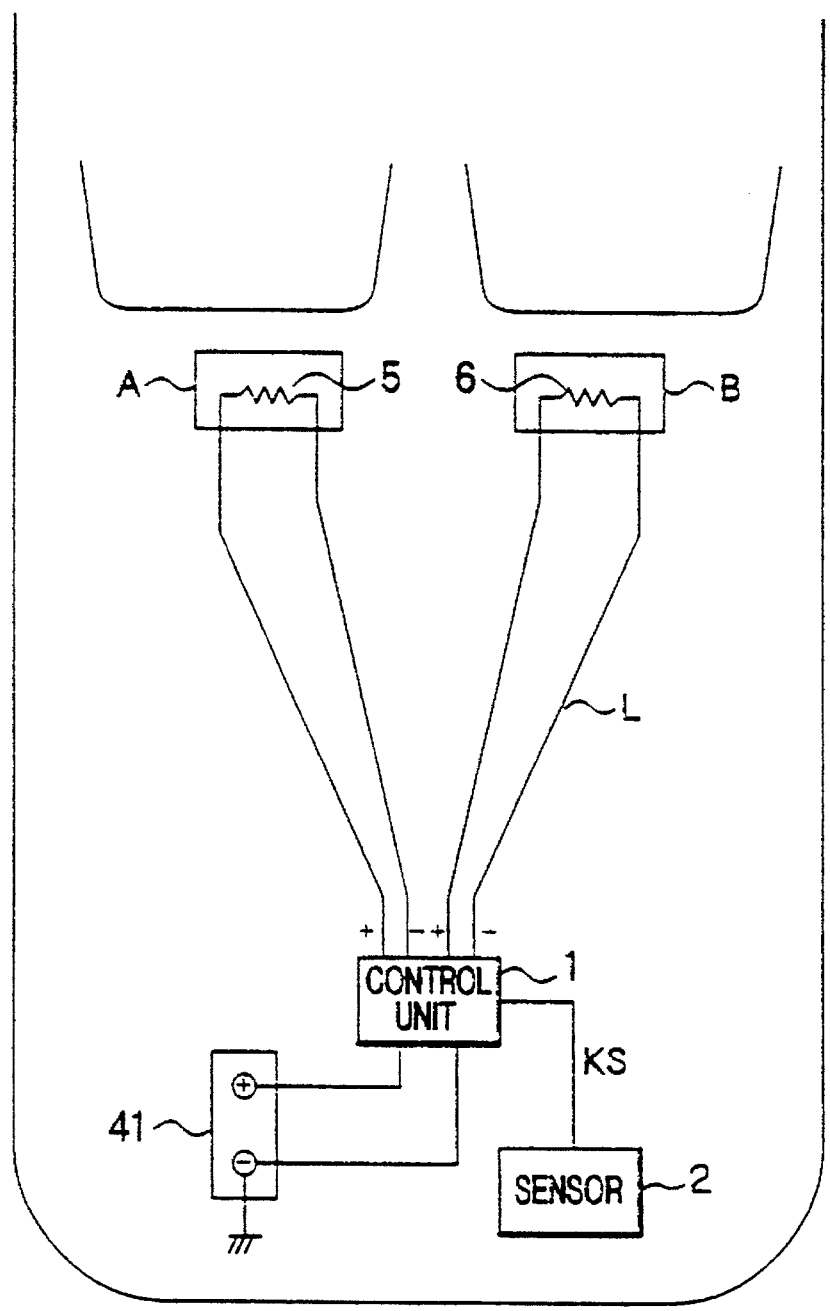
FIG.5 illustrates a typical arrangement of component parts in a vehicle.

As illustrated in FIG. 3, with field-effect transistors 11 and 21 connected to safety switch 7, ignition squibs 5 and 6 may be connected respectively to transistors 11 and 21, respectively, through current detecting resistor 12 and 22. In this case, the operation is exactly the same way as that in the first embodiment.

In each of the above-described embodiments, although an air bag was used as safety device, the application of the invention is not limited thereto. The present invention is equally applicable when, for example, a seat belt constraining device is used as safety device.

What is claimed is:

1. A control circuit for a vehicle safety device comprising:

starting means for starting the vehicle safety device by electrical energy supplied from a power supply means;

starting signal generating means which detects vehicle impact and generates a starting signal; and starting control means, connected between power supply means and said starting means, for supplying current from the power supply means to said starting means when the starting signal has been generated by said starting signal generating means, and for blocking supply of current from the power supply means to said starting means when the current value has exceeded a predetermined value.

2. A control circuit according to claim 1, wherein said starting control means includes switching means for electrically connecting said starting means and power supply means responsive to a starting signal, and for electrically blocking said starting means and power supply means responsive to an absence of the starting signal; current detecting means for detecting current flowing from power supply means to said starting means; and current control means for causing the starting signal, generated by said starting signal generating means, to be input to said switching means when the current value detected by said current detecting means is less than a predetermined value, and for stopping the starting signal, generated by said starting signal generating means, from being input to said switching means when the current value exceeds a predetermined value.

3. A control circuit according to claim 2, wherein said starting means is connected between ground and the power supply means, and wherein said switching means is connected between said starting means and power supply means.

4. A control circuit according to claim 2, wherein said current control means includes a comparator for comparing current value detected by said current detecting means with a predetermined value; and conduction control circuit, which is connected between said starting signal generating means and said switching means, and which passes or blocks current flow between said starting signal generating means and said switching means based on the comparison results of said comparator.

* * * * *